United States Patent [19]

Ludman

[11] Patent Number: 4,516,854

[45] Date of Patent: May 14, 1985

[54] INTERFEROMETRIC ANGULAR MEASUREMENT SYSTEM

[76] Inventor: Jacques E. Ludman, 98 Old Lowell Rd., Westford, Mass. 01886

[21] Appl. No.: 326,857

[22] Filed: Dec. 3, 1981

[51] Int. Cl.³ .............................................. G01B 11/26
[52] U.S. Cl. .................................................. 356/363
[58] Field of Search ................ 356/363, 359, 354, 345

[56] References Cited

U.S. PATENT DOCUMENTS 3,034,397  5/1962  Saunders ........................... 356/363
4,056,323  11/1977  Ludman ............................. 356/345

FOREIGN PATENT DOCUMENTS 711352  1/1980  U.S.S.R. ............................ 356/363

OTHER PUBLICATIONS

Zubakov, V. G. et al., "An Interference Method of Measuring Small Deviations of Angles from Specified Values", Soviet J. Opt. Tech, vol. 42, No. 10, Oct. 1975.

*Primary Examiner*—Bruce Y. Arnold

[57] ABSTRACT

An interferometric system for general use to measure the angular relationship of two surfaces of the same object, or of different objects, or the relative angular change of one surface with respect to another. This device uses coherent light, a set of mirrors aligned as a Ludman Interferometer, and a reference pair of mirrors with a well known fixed angle similar to that of the angle of the sample pair to be measured. In preferred embodiments, the fixed angle mirror pair has a fine tilt adjustment to facilitate the interpretation of the output fringe pattern.

3 Claims, 2 Drawing Figures

INTERFEROMETRIC ANGULAR MEASUREMENT SYSTEM

BACKGROUND OF THE INVENTION

This invention relates to interferometers and particularly to a method and means for measuring the relative angle between two subject mirrors. The two subject mirrors may be fixed, or if they are not, this invention will measure both the relative angle and changes in the relative angle between the two subject mirrors.

Conventional interferometric techniques have long been used to measure relative characteristics of optical surfaces, but in general, the techniques have always compared the surface being measured with a reference surface. It has always been difficult to measure or compare two surfaces on the same object. The one exception might be the measurement of two surfaces of a transparent object where one of the interfering beams is transmitted through the object to one of the surfaces (Fabry-Perot). A recent invention U.S. Pat. No. 4,056,323) permitted for the first time the measurement of two parallel opaque surfaces such as laser rods or guage blocks. That device is currently being marketed by Space Optics Research Labs in Chelmsford MA under the name Ludman Interferometer (L-I). That device is well suited to measuring parallelism but not for the measurement of any other angles. The measurement of other angles is very important for applications such as optical scanners or readers and also for a wide variery of high tolerance machine parts. The invention described here uses the L-I as one of its components and is capable of measuring any angle between two subject mirrors.

SUMMARY OF THE INVENTION

In accordance with an embodiment of the present invention an interferometric angular measurement system is provided and used to measure the angle between two angled subject mirrors such as the sides of an optical scanner. As in the L-I a beam of light from a laser is split into two beams and adjusted to be counter propagating in the region of the sample measurement. One of the counter propagating beams is directed to one face of the sample and the other beam is directed to the other face of the sample. These two beams are then directed to an external reference angle which redirects the beams back into the L-I and in due course onto a screen where the two beams interfere. The resulting pattern corresponds to the relative angular difference between the reference and the sample. If the reference is tilted until the fringes are vertical the pattern is a direct measure of the absolute angular difference between the reference and the sample. If there are no vertical fringes the reference angle and sample angle are the same.

If the subject mirrors or sample mirrors do not have a fixed angle between them but are variable then the output pattern may be used to measure relative changes in the sample angle. A count of the fringe motion is an accurate measure of the extent of change of the angle between the two subject mirrors.

DESCRIPTION OF THE EMBODIMENT OF THE INVENTION

Figure 1:
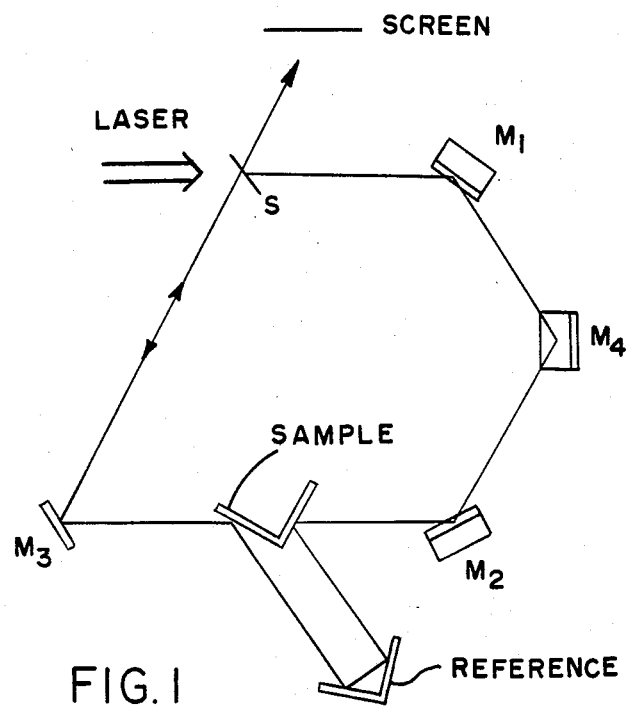
FIG. 1 is a schematic drawing of an interferometric angular measurement system which uses two split beams from a laser and a L-I to provide two counter propagating beams in the measurement region. The two counter propagating beams are deflected by the two surfaces of the sample to be measured and then directed to a similar reference angle which redirects the beams back to the sample and thence through the L-I to the observation screen.
Figure 2:
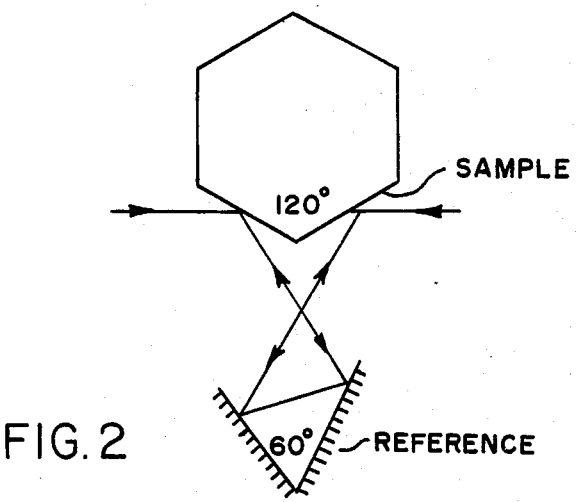
FIG. 2 shows a reference angle in use which is not the same angle as the sample angle but is the supplement of the sample angle. The counter propagating beams cross between the sample and reference mirrors. This configuration is preferred for the measurement of obtuse angles.

Referring first to FIG. 1 and FIG. 2 there is illustrated by a diagram an interferometric angular measurement system which is used for measuring the angle between two subject mirrors or the angle between two fixed faces on a solid object. The system includes a monochromatic source of light or a laser, a Ludman Interferometer, and an external reference angle mirror pair. After alignment of the L-I, the two counter propagating beams are reflected respectively off the faces of the subject mirrors. Each beam then, in turn, reflects off both faces of the external reference angle and returns for a final reflection from the first subject mirror or second subject mirror of the fixed object. Thus each beam reflects from both reference mirrors and both subject mirrors. If the reference and the sample have identical angles then the output pattern viewed on the screen will be identical to the alignment pattern of the L-I. If the sample and the reference differ by some small angle the two resulting beams will not be counter propagating after the reflections, but will be inclined at a small angle to each other. It is easy to show that the small angular difference between the two beam is just four times the difference in angle between the sample and reference. Any relative difference in vertical inclination between the sample and the reference will result in a horizontal component of the output fringes which may easily be removed by simply tilting the reference until the fringes are vertical. The vertical fringe pattern then is an accurate measurement of the angular difference between the sample and the reference.

I claim:

1. An interferometric angular measurement system for measuring the angle between a first subject mirror and a second subject mirror comprising:

a source of coherent radiation directed along an initial path;

an observation screen for the radiation;

means in said path for splitting said radiation into two substantially equal intensity beams, a first beam and a second beam;

first optical means including first, second, and third mutually perpendicular reflecting surfaces for directing the first beam to said first subject mirror;

second optical means for directing the second beam to said second subject mirror;

third optical means including two reflecting surfaces and a tilt adjustment mechanism with an angle between the two reflecting surfaces which is approximately equal to the angle between said first and second subject mirrors for directing the first beam after it has been reflected off the first subject mirror to the second subject mirror, and for directing the second beam after it has reflected off the second subject mirror to the first subject mirror;

wherein said tilt adjustment serves to eliminate any vertical angular deviation of said first and second beams, wherein said second angled subject mirror serves to direct the first beam to the second optical means, wherein said first angled subject mirror serves to direct the second beam to the first optical means, wherein the first optical means serves to direct the second beam back to the beam splitting means, wherein the second optical means serves to direct the first beam back to the beam splitting means, and wherein at said beam splitting means a substantial portion of said first and second beams are superimposed and directed to said observation screen, whereby light patterns appearing on said observation screen are successively indicative of the angular difference between the subject mirrors versus the reflective surfaces of the third optical means.

2. An interferometric angular measurement system for measuring the angle between an approximately perpendicular first subject mirror and a second subject mirror comprising:

a source of coherent radiation directed along an initial path;

an observation screen for the radiation;

means in said path for splitting said radiation into two substantially equal intensity beams, a first beam and a second beam;

first optical means including first, second, and third mutually perpendicular reflecting surfaces for directing the first beam to said first subject mirror;

second optical means for directing the second beam to said second subject mirror;

third optical means comprising a 90 degree corner cube for directing the first beam after it has been reflected off the first subject mirror to the second subject mirror, and for directing the second beam after it has reflected off the second subject mirror to the first subject mirror;

wherein said second angled subject mirror serves to direct the first beam to the second optical means, wherein said first angled subject mirror serves to direct the second beam to the first optical means, wherein the first optical means serves to direct the second beam back to the beam splitting means, wherein the second optical means serves to direct the first beam back to the beam splitting means, and wherein at said beam splitting means a substantial portion of said first and second beams are superimposed and directed to said observation screen, whereby light patterns appearing on said observation screen are successively indicative of the angular difference between the subject mirrors versus the ninety degree reference provided by the corner cube.

3. An interferometric angular measurement system for measuring the angle between a first subject mirror and a second subject mirror comprising:

a source of coherent radiation directed along an initial path;

an observation screen for the radiation;

means in said path for splitting said radiation into two substantially equal intensity beams, a first beam and a second beam;

first optical means including first, second, and third mutually perpendicular reflecting surfaces for directing the first beam to said first subject mirror;

second optical means for directing the second beam to said second subject mirror;

third optical means including two reflecting surfaces and a tilt adjustment mechanism with an angle between the two reflecting surfaces which is approximately equal to the supplement of the angle between said first and second subject mirrors for directing the first beam after it has been reflected off the first subject mirror to the second subject mirror, and for directing the second beam after it has reflected off the second subject mirror to the first subject mirror;

wherein said tilt adjustment serves to eliminate any vertical angular deviation of said first and second beams, wherein said second angled subject mirror serves to direct the first beam to the second optical means, wherein said first angled subject mirror serves to direct the second beam to the first optical means, wherein the first optical means serves to direct the second beam back to the beam splitting means, wherein the second optical means serves to direct the first beam back to the beam splitting means, and wherein at said beam splitting means a substantial portion of said first and second beams are superimposed and directed to said observation screen, whereby light patterns appearing on said observation screen are successively indicative of the angular difference between the subject mirrors versus the reflective surfaces of the third optical means.

* * * * *